United States Patent [19]
Sinkoff

[11] Patent Number: 4,966,487
[45] Date of Patent: Oct. 30, 1990

[54] CONNECTING DEVICES FOR GRIDS

[76] Inventor: Howard L. Sinkoff, 244 Jennings Ave., Patchogue, N.Y. 11772

[21] Appl. No.: 494,756

[22] Filed: Mar. 16, 1990

[51] Int. Cl.⁵ .............................................. F16D 1/00
[52] U.S. Cl. ...................................... 403/24; 403/170; 403/174; 52/646
[58] Field of Search .................. 52/646, 581; 403/170, 403/169, 174, 178, 173, 24

[56] References Cited

U.S. PATENT DOCUMENTS

| | | | |
|---|---|---|---|
| 3,092,217 | 6/1963 | Alloggio | 403/173 |
| 3,687,500 | 8/1972 | Silvius | 52/282 X |
| 3,863,416 | 2/1975 | Oroschakoff | 52/646 |
| 3,891,335 | 6/1975 | Feil | 403/173 |

*Primary Examiner*—Andrew V. Kundrat
*Attorney, Agent, or Firm*—Edward H. Loveman

[57] ABSTRACT

This invention involves connectors for vertical end rectangular grids having spaced pairs of vertical end rails joined to horizontal rods extending between the end rails with vertical spaced rails between the end rails. Each connector includes a rigid, flat plate formed with two or more horizontally spaced symmetrical notches. Each notch has a passage extending inwardly from an end edge of the plate. The passage terminates at two inner opposed concave lobes each of of which slidably engages a respective vertical end rail. The passages permit the plate to move beyond the horizontal rods when the plate is moved along the end rails. A third inner lobe between the two opposing lobes allows the plate to pass free projecting ends of plates can have two, three, four or more notches to hold vertical grids in free standing, upright angular arrays. Stop blocks can be placed below the connectors to hold them in desired positions on the rails supported by the horizontal rods projecting through the rails.

8 Claims, 3 Drawing Sheets

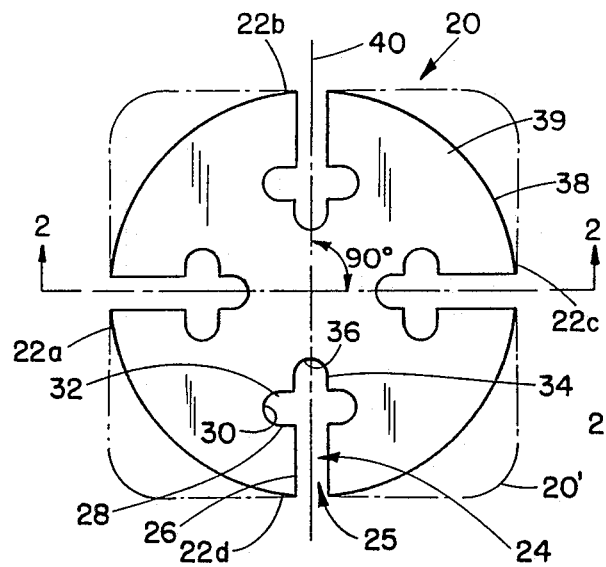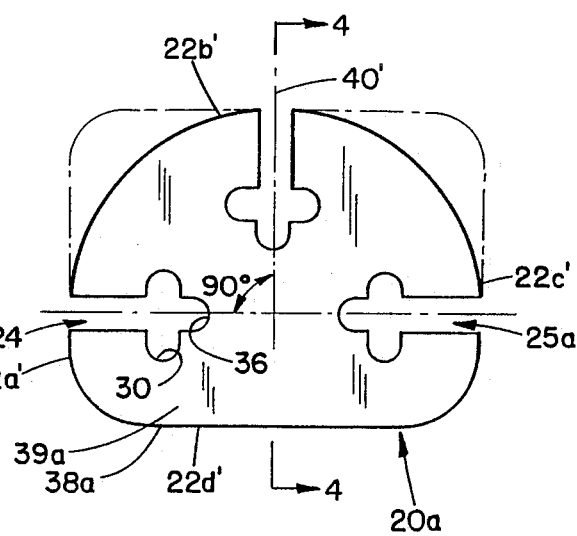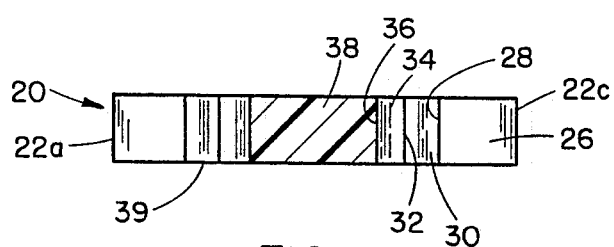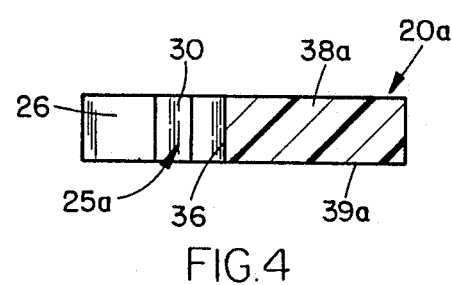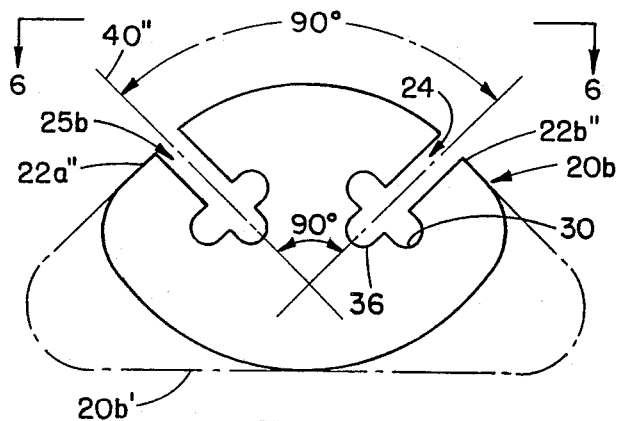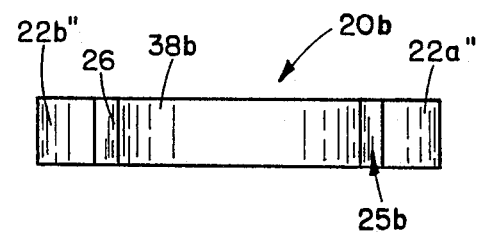

CONNECTING DEVICES FOR GRIDS

BACKGROUND OF THE INVENTION

1. Field of the Invention

This invention relates to connecting devices for grids, and more particularly concerns connectors which can connect a plurality of flat, rectangular, vertical grids made of metal or plastic crossed bars, rods, tubes or wires, for making clothing and merchandising display and storage assemblies in various configurations.

2. Description of the Prior Art

It has been conventional heretofore to employ rectangular grids, gratings and lattices for free standing merchandise display and storage assemblies. The individual grids are made of crossed bars, rods, tubes or wires and serve to support items of merchandise to be displayed and/or stored. Connectors in the form of clamps are generally used to attach the grids together in various vertical arrays. These clamps employ screws and nuts and are often multipart structures requiring hand tools to assemble them. Since it is often desirable to change the grid array configuration to a different arrangement or to take it apart, it is desirable that the connectors be quickly detachable and engageable. This is not possible with prior connectors. Furthermore these prior connectors are expensive, require tools to assemble and disassemble the several grids in an array, and much labor time.

SUMMARY OF THE INVENTION

It is a principal object of the present invention to provide grid connectors which can connect two, three, four or more rectangular grids together to form a variety of two and three dimensional vertical grid assemblies.

Another object of the present invention is to provide grid connectors which have one-piece structures that are quickly attachable and detachable without use of tools, and which are light in weight, inexpensive to manufacture, noncorrosive, rigid, strong, and very durable.

According to the invention, there is provided a connector in the form of a rigid, flat slab or plate made of plastic material. In the plate is a plurality of notches each having a three-lobed formation. The notches are oriented in different directions so that when they are engaged on vertical end rails of rectangular grids, the grids will be oriented in different direction. As examples the connectors may have two, three or four notches. Two or more connectors can connect each pair of grids in a desired parallel or angular array. The end rails of each grid are engaged in two opposed lobes of a notch while the third lobe enables the connector to be moved beyond protruding horizontal rods to a desired attachment location. Stop members are provided for insertion under the connectors to hold them in position at the selected location on the rails. When desired the entire array can be quickly disassembled for reassembly elsewhere or storage, without use of hand tools.

These and other objects and many of the attendant advantages of this invention will be readily appreciated as the same becomes better understood by reference to the following detailed description when considered in connection with the accompanying drawings in which:

BRIEF DESCRIPTION OF THE DRAWINGS

FIG. 1 is a top plan view of a four-notch connector embodying the invention;

FIG. 2 is a cross sectional view taken along line 2—2 of FIG. 1;

FIG. 3 is a top plan view of a three-notch connector;

FIG. 4 is a cross sectional view taken along line 4—4 of FIG. 3;

FIGS. 5 and 7 are top plan views of two-notch connectors with notches at different angular orientations;

FIG. 6 is an end elevational view taken along line 6—6 of FIG. 5

DESCRIPTION OF THE PREFERRED EMBODIMENTS

Figure 7:
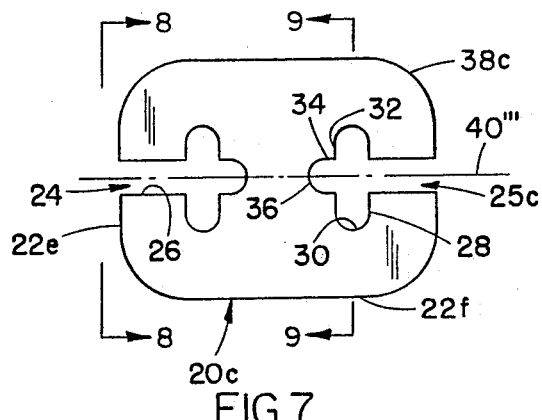

Referring now to the drawings wherein like reference characters designate like or corresponding parts throughout, there is illustrated in FIGS. 1 and 2, a four-notch connector embodying the invention and generally designated by numeral 20. The connector 20 is approximately circular in plan view with four edges 22a-22d. The edges 22a and 22c are parallel to each other at their centers and perpendicular to edges 22b and 22d which are parallel to each other at their centers. If desired the connector 20 may have a more rectangular configuration with rounded corners as indicated by dotted lines 20' in FIG. 1. In each of the edges 22a-22d is a notch 25 which has a passage 24 defined by two spaced, short, straight parallel edges 26 extending inwardly from the outer edge 22a-22d. The edges 26 terminate at edges 28 of two opposed concave lobes 30 which have short, straight, inner edges 32 parallel to edges 28 and terminate at parallel edges 34 of of an innermost, third lobe 36. The concave lobe 36 faces outwardly toward the free edge 22a-22d of the connector. The edges 34 are coplanar and aligned with the edges 26. The connector 20 is a rigid slab or plate 38 preferable made of tough, durable plastic material which is light in weight and has a flat top and bottom surfaces 39. The thickness of the plate 38 in a preferred embodiment is about three-eighths of an inch and may have an overall length and width of about two and a half inchs. The connector 20 is arranged so that as many as four vertical grids 40 indicated by dotted lines can be connected together in a mutually rectangular configuration to form a free standing array. The method in which the connector 20 is installed in place is described in further detail below. The notches 25 are centrally oriented 90° apart.

A connector 20a, shown in FIGS. 3 and 4, has a three-notch structure. A plate 38a is generally rectangular in plan view as indicated by dotted line 20a' and; has three mutually perpendicular flat sides or edges 22a', 22b' and 22c', and flat, parallel opposite sides or surfaces 39a. Three notches 25a are provided in connector 20a. These notches are centrally oriented 90° apart in an arrangement identical to the three notches 25 at the edges 22a, 22b and 22c of the connector 20. The fourth edge 22d' is straight and not notched. The three lobes 30, 30, and 36 in each notch are identical to the lobes 30, 30 and 36 described above and illustrated in FIGS. 1 and 2. The thickness of the plate or slab 38a is the same as that of plate 38. This arrangement of the connector 20a enables three grids 40' to be disposed and connected in mutually perpendicular vertical positions. Two or more connectors 20a will be used to connect the grids in a manner described below in connection with FIGS. 12-15.

A connector 20b shown in FIG. 5 has basically a modified triangular shape 20b'. Two notches 25b are provided at flat edges 22a" and 22b" which are perpendicular to each other at the notches. The notches 25b have three lobes, 30, 30 and 36, and straight internal edges identical to each of those of the notches 25 described above in connections with FIGS. 1 and 2. The notches 25b are centrally oriented 90° apart. The connector 20b will connect two grids 40" in mutually perpendicular vertical positions. The thickness of the plate 38b is the same as that of plates 38 and 38a.

Figure 8:
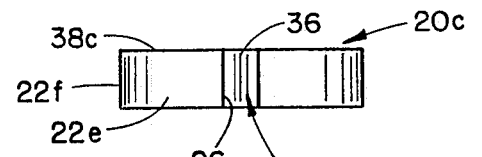
FIG. 8 is an end elevational view taken along line 8—8 of FIG. 7.
Figure 9:
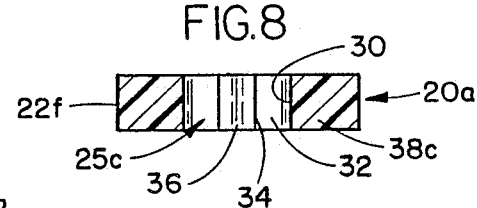
FIG. 9 is a cross sectional view taken along line 9—9 of FIG. 7.

A connector 20c shown in FIGS. 7, 8 and 9 has a plate 38c which generally is rectangular in shape with opposite parallel shorter edges 22e and opposite parallel longer edges 22f. The plate 38c is formed with two notches 25c in edges 22d. The notches are centrally oriented 180° apart so that two vertical grids 40''' will be disposed in coplanar alignment.

Figure 10:
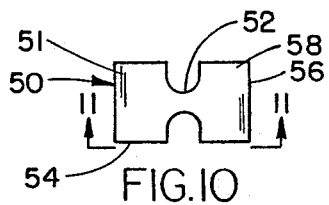
FIG. 10 is a top plan view of a stop member.
Figure 11:
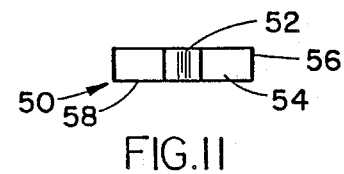
FIG. 11 is a side elevational view taken along line 11—11 of FIG. 10.
Figure 12:
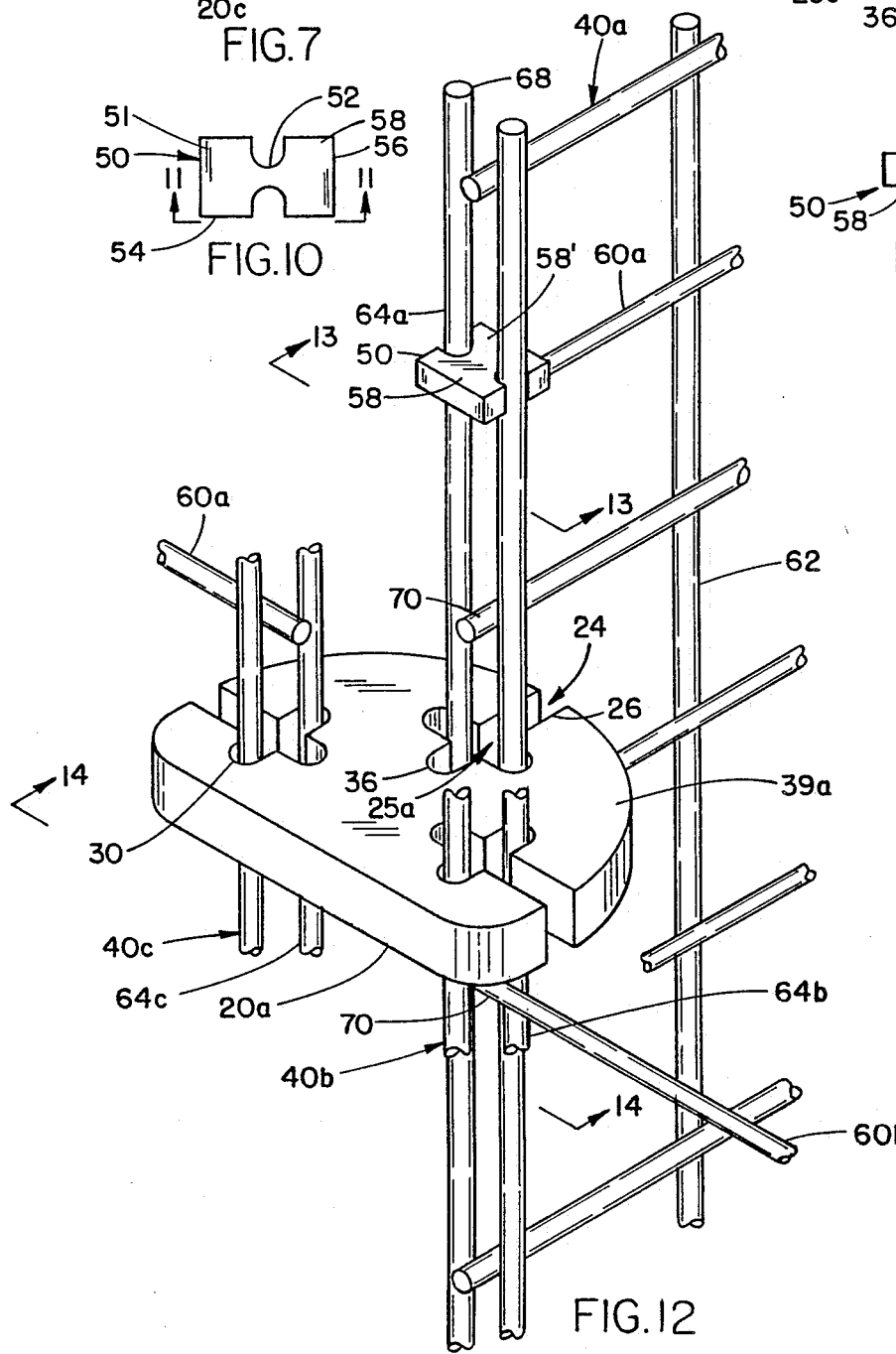
FIG. 12 is a perspective view of parts of three vertical, rectangular grids held in mutually right-angled position by a three-notch connector according to the invention.
Figure 13:
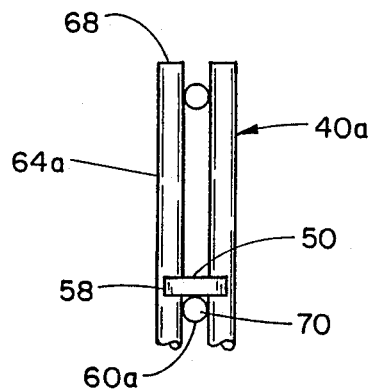
FIGS. 13 and 14 are fragmentary end elevational views taken along lines 13—13 and 14—14 of FIG. 12.
Figure 14:
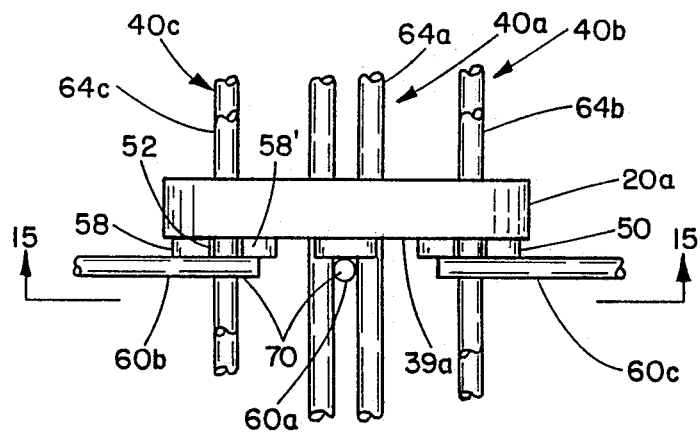

A rigid stop piece or element 50 shown in FIGS. 10, 11 is provided for use with each of the connectors shown in FIGS. 1-9. This stop piece 50 is a rectangular block 51 thinner than each of the connectors 20. The top piece 50 has two notches 52 extending inwardly of opposite longer edges 54 midway between end edges 56 to define rectangular end tabs 58.

The manner in which the connectors 20, 20a-20c and stop members 50 are used will now be described with particular reference to FIGS. 12-15. In FIGS. 12-15 are shown parts of three vertical rectangular grids 40a, 40b and 40c having respective horizontal bars 60a, 60b and 60c joined to crossing vertical rails 62. The grids 40a, 40b and 40c each have a pair of spaced respective vertical rails 64a, 64b and 64c at ends of the grids 40a-40c. The grids 40a-40c are connected by a plurality of connectors 20a only one of which is shown in the drawings. The other connectors will be disposed vertically about twelve to eighteen inches apart and engaged with the double rails 64a-64c either above or below the one connector 20a shown in FIG. 12. Each pair of rails 64a-64c is engaged in a different one of the notches 25a. The double rails 14 are nested snugly in the opposed lobes 30 of each notch 25a. The connectors 20a are mounted on the grids 40 by placing each connector 20a in turn on a free top ends 68 of the double-end rails 64 and pushing the connector 29a down on all three pairs of the rails 64a-64c simultaneously to lock the grids 40 in three mutually perpendicular vertical positions. After each of the connectors 20a is located in a desired position vertical above one of the horizontal rods or bars 60a-60c, a stop member 50 will be turned like a key 90° to a horizontal position and lowered to an end 70 of a horizontal rod 60a, 60b or 60c. There each stop member will lie flat on the horizontal rod 60a with one tab extending outwardly beyond rails 64a and the other tab 58' disposed on the rod 60a inwardly of the rails 64a.

The ends 70 of the horizontal rods 60a-60c may extend outwardly beyond the double vertical rails 64a, 64b and 64c. When the connector 20a is lowered, the passages 24 defined by spaced edges 26 pass the ends 70 of the rods without interference. If the ends 70 of the horizontal rods extend far enough beyond the rails 64a-64c, then the inner lobes 36 will pass the rod ends 70. By this arrangement, the connector 20a can be seated in a desired horizontal position along the double rails without interference by the outwardly projecting rods 60a-60c which serve as supports underlying each of the stop members 50 and the connector 20a.

Figure 15:
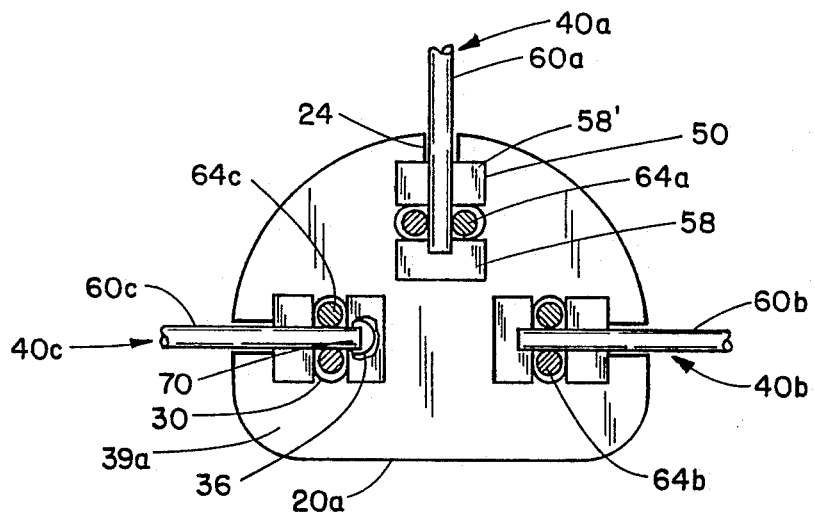
FIG. 15 is a fragmentary horizontal cross sectional view taken along line 15—15 of FIG. 14.

The three grids 40a-40c define a general T-shaped array in plan view as shown in FIG. 15. If four grids are to be disposed in a cross-like array, then connector 20 can be used. Each notch 25 will engage one pair of spaced vertical end rails 64 of one grid 40. Two or more vertically spaced connectors 20 can be used to join four grids to make a free standing, cross-like array, the vertical plane each vertical grid disposed at right angles to two adjacent vertical grids.

It is of course possible to use connectors 20 and 20a to join only two grids in right angled or in coplanar array. However the connector 20b is preferred if only two grids 40" are to be connected in mutually perpendicular array, to obtain a neater appearance with no exposed notchs. The double rails 64 at the ends of the two grids 40 will engage in respective notches 25b oriented 90° apart between their vertical planes of symmetry as shown in FIG. 5. If two grids are to be joined in vertical coplanar array, the connector 20c shown in FIG. 7 can be used to engage the double rails 40''' in lobes 30 of the notches 25c. Here stop members 50 will disposed ;under the connectors 20b and 20c to rest in horizontal rods 60 of the grids 40.

It will be noted that all of the connectors 20, 20a-20c are symmetrical in form. Thus either surface can be placed uppermost. The double rails 64a-64c and rods 60a-60c are shown in the drawings as cylindrical or round; however they can be rectangular, hexagonal or have other regular geometrical shape.

The array of grids assembled and joined by the connectors 20, 20a and 20b will be stable and will not sway or twist in the free standing arrays of two, three or four grids. The coplanar vertical arrays of grids made by using connectors 20c should be supported by a solid vertical support such as a building wall, column, fence or the like.

The arrays of grids can be quickly disassembled by moving the parts of the connectors in reverse order from that used in assembly. No tools and no special skills are required. The rods and rails of the grids 40 can be joined together in any conventional way such as by welding, or the like.

It should by understood that the forging relates to a only a preferred embodiment of the invention which has been by way of example only, and that it is intended to cover all changes and modifications of the examples of the invention herein chosen for the purpose of the disclosure, which do not constitute departures from the spirit and scope of the invention.

What is claimed is:

1. A connector for joining in a horizontal angular array at least two vertical rectangular grids, each of said grids having horizontal rods connected and disposed between two spaced pairs of vertical spaced end rails and a plurality of spaced vertical rails each connected to said horizontal rods and spaced between said pairs of end rails, comprising;

a flat rigid plate having spaced end edges with a symmetrical notch formed in each of said edges, each of said notches having a passage extending inwardly from one of said edges and terminating at two laterally spaced opposing concave lobes, the spacing of said lobes being substantially equal to that of said end rails to snugly and slidably engage said rails, and a third concave lobe being located to pass said rods when said plate slides vertically along said rails.

2. A connector as defined in claim 1, wherein said third concave lobe is disposed between said opposed lobes and located inwardly of said plate further from said one end edge for passing free ends of said horizontal rods when said plate slides vertically along said rails.

3. A connector as defined in claim 2, further comprising a rectangular stop member located beneath said plate at each of said opposed notches and resting on one of said horizontal rods to support said plate thereat.

4. A connector as defined in claim 2, wherein said plate has two of said notches oriented 180° apart so that said grids are joined vertically in coplanar alignment.

5. A connector as defined in claim 2, wherein said plate has two of said notches oriented apart at an acute horizontal angle so that said grids are joined vertically angularly at an angle corresponding to said acute angle.

6. A connector as defined in claim 2, wherein said plate has at least three of said notches oriented apart at an acute horizontal angle so that three of said grids are joined vertically in a free standing array and oriented angularly at horizontal angles corresponding to said acute horizontal angels of the orientation of said notches.

7. A connector as defined in claim 2, wherein said plate has at least four of said notches oriented apart at acute horizontal angles so that four of said grids can be joined vertically and oriented in a horizontal cross-like arrangement to form an upright free standing array of grids.

8. A connector as defined in claim 7, wherein said plate is generally rectangular in form with said end edges disposed at right angles to each so that said grids in said array are joined in mutually perpendicular positions.

* * * * *